US012202105B2

(12) United States Patent
Ji et al.

(10) Patent No.: US 12,202,105 B2
(45) Date of Patent: Jan. 21, 2025

(54) POWER TOOL

(71) Applicant: Nanjing Chervon Industry Co., Ltd., Nanjing (CN)

(72) Inventors: Guangjie Ji, Nanjing (CN); Hongtao Ke, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/457,582

(22) Filed: Aug. 29, 2023

(65) Prior Publication Data

US 2024/0131666 A1 Apr. 25, 2024
US 2024/0227138 A9 Jul. 11, 2024

(30) Foreign Application Priority Data

Oct. 24, 2022 (CN) ......................... 202211306521.0
Oct. 24, 2022 (CN) ......................... 202222800901.1

(51) Int. Cl.
*B25B 23/18* (2006.01)
*B25B 21/02* (2006.01)

(52) U.S. Cl.
CPC .............. *B25B 23/18* (2013.01); *B25B 21/02* (2013.01); *B25D 2250/121* (2013.01)

(58) Field of Classification Search
CPC .... B25B 23/18; B23B 45/003; F21V 33/0084
See application file for complete search history.

(56) References Cited

U.S. PATENT DOCUMENTS

2010/0149790 A1* 6/2010 Leong ..................... B25F 5/021 362/119

* cited by examiner

*Primary Examiner* — Sean P Gramling
(74) *Attorney, Agent, or Firm* — Greenberg Traurig, LLP

(57) ABSTRACT

A power tool includes a first illumination mechanism illuminating a region in front of an output shaft. The first illumination mechanism includes an illumination element generating light for illumination, where the illumination element is mounted in a mounting groove formed by the front end of the first housing; and a lampshade covering at least the front of the illumination element, where part of the lampshade located in front of the illumination element is light-transmissive material, and the lampshade is detachably mounted on the first housing. The illumination mechanism is convenient for replacement.

15 Claims, 12 Drawing Sheets

POWER TOOL

RELATED APPLICATION INFORMATION

This application claims the benefit under 35 U.S.C. § 119(a) of Chinese Patent Application No. CN 202222800901.1, filed on Oct. 24, 2022 and Chinese Patent Application No. CN 202211306521.0, filed on Oct. 24, 2022, which applications are incorporated herein by reference in their entireties.

TECHNICAL FIELD

The present application relates to a power tool.

BACKGROUND

An electric impact wrench, an impact screwdriver, an electric drill, a screwdriver, and other handheld power tools can be used anywhere from indoor workspaces that are well-lit to those outdoor construction sites or other regions that are not always well-lit. During work, to improve the operation accuracy, the construction site needs to be illuminated, so an illumination device needs to be disposed on the housing. At present, the requirements for the illumination region of the illumination device are getting higher and higher, and the requirements for the compactness and miniaturization of the handheld power tool are also increasing. In the related art, the lamp and the lampshade of the illumination device have an integrated structure. In this manner, when damaged, the lamp or the lampshade needs to be replaced as a whole.

This part provides background information related to the present application, which is not necessarily the existing art.

SUMMARY

A power tool includes an output shaft for outputting power; a housing including a first housing for supporting the output shaft, where at least part of the output shaft is rotatably disposed in the first housing; and a first illumination mechanism illuminating a region in front of the output shaft. The first illumination mechanism includes an illumination element generating light for illumination, where the illumination element is mounted in a mounting groove formed by the front end of the first housing; and a lampshade covering at least the front of the illumination element, where part of the lampshade located in front of the illumination element is light-transmissive material, and the lampshade is detachably mounted on the first housing.

In some examples, a gap exists between the lampshade and the illumination element along the extension direction of the output shaft.

In some examples, the mounting groove is annular, and the mounting groove and part of the first housing supporting the output shaft are integrally formed and disposed along the circumferential direction of the output shaft.

In some examples, the illumination element is mounted in the mounting groove.

In some examples, the illumination element includes a lamp substrate and a light-emitting element on the lamp substrate.

In some examples, multiple light-emitting elements are provided along the circumferential direction of the output shaft.

In some examples, multiple lamp substrates are provided, the light-emitting element is disposed on each of the multiple lamp substrates, and the multiple lamp substrates are disposed along the circumferential direction of the output shaft.

In some examples, the lamp substrate is an annular substrate and disposed around the output shaft.

In some examples, the lamp substrate is mounted in the mounting groove.

In some examples, the mounting groove includes a first annular surface, a second annular surface, and a groove bottom connecting the first annular surface to the second annular surface, and the illumination element is disposed between the first annular surface and the second annular surface.

In some examples, the lampshade includes a light emission portion and a first connecting portion, where the light emission portion is located in front of the illumination element, a second connecting portion is disposed on the first annular surface or the second annular surface of the mounting groove, and the first connecting portion is detachably connected to the second connecting portion.

In some examples, the second connecting portion includes a first groove and a second groove that are disposed on the second annular surface and connect with each other, and the first connecting portion penetrates the first groove, is rotated, and then enters the second groove.

In some examples, the power tool further includes a protective cover, where the protective cover is annular and at least partially disposed on the outer circumference of the lampshade.

In some examples, the protective cover is made of soft materials.

In some examples, the illumination element further includes a wire, the first housing includes a wire lead-out groove for accommodating the wire, the wire lead-out direction of the wire is parallel to an axis of the output shaft, and the wire lead-out groove is located below the output shaft.

A power tool includes an output shaft for outputting power; a housing including a first housing for supporting the output shaft, where at least part of the output shaft is rotatably disposed in the first housing; and a first illumination mechanism illuminating a region in front of the output shaft. The first illumination mechanism includes an illumination element generating light for illumination, where the illumination element is accommodated in a mounting groove formed by the front end of the first housing, and an optical axis of the light emitted by the illumination element is oblique outward relative to the output shaft.

A power tool includes an output shaft for outputting power; a housing including a first housing for supporting the output shaft, where at least part of the output shaft is rotatably disposed in the first housing; and a first illumination mechanism illuminating a region in front of the output shaft. The first illumination mechanism includes an illumination element generating light for illumination, where the illumination element is accommodated in a mounting groove formed by the front end of the first housing, at least two illumination elements are provided, and an optical axis of the light emitted by any one of the at least two illumination elements is oblique outward relative to the output shaft.

In some examples, the power tool further includes a lampshade covering at least the front of the at least two illumination elements, where part of the lampshade located in front of the at least two illumination elements is light-transmissive material, and the lampshade is detachably mounted on the first housing.

In some examples, multiple illumination elements are annularly disposed along the circumferential direction of the output shaft.

In some examples, each of the at least two illumination elements includes a lamp substrate and a light-emitting element on the lamp substrate, multiple lamp substrates are provided, the light-emitting element is disposed on each of the multiple lamp substrates, and the multiple lamp substrates are disposed along the circumferential direction of the output shaft.

DETAILED DESCRIPTION

Figure 1:
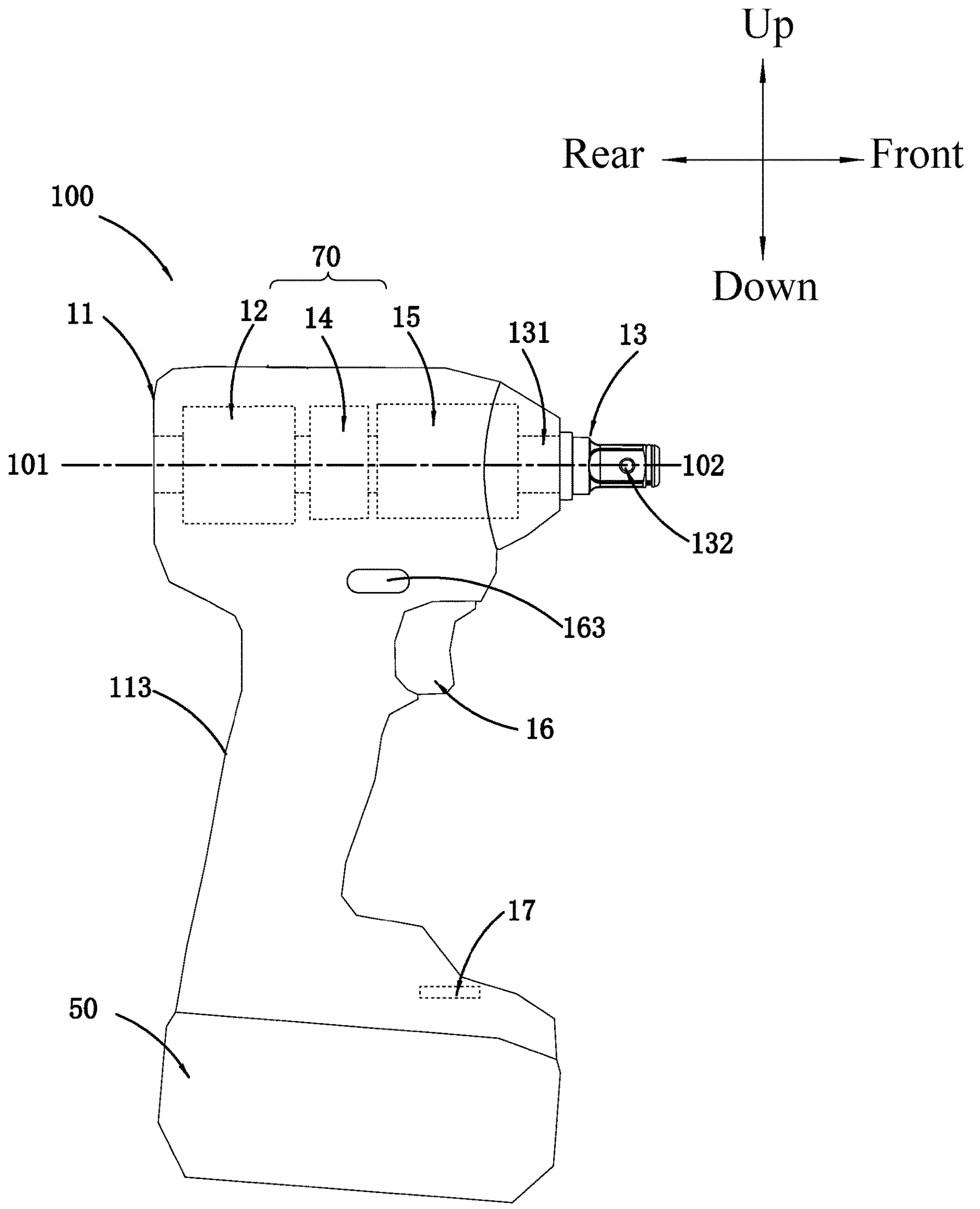
FIG. 1 is a structural view of an example of the present application.

Before any example of the present application is explained in detail, it is to be understood that the present application is not limited to the application in the structural details and arrangement of components set forth in the following description or shown in the preceding drawings.

In the present application, the term "comprising", "including", "having", or any other variant thereof is intended to encompass a non-exclusive inclusion so that a process, method, article, or device that includes a series of elements not only includes the expressly listed elements but also includes other elements that are not expressly listed or further includes the elements that are inherent to such a process, method, article, or device. In the absence of more restrictions, the element defined by the statement "including a . . . " does not exclude the presence of additional identical elements in the process, method, article, or device that includes the element.

In the present application, the term "and/or" is an association relationship describing associated objects and indicates that three relationships may exist. For example, A and/or B may indicate that A exists alone, A and B exist simultaneously, and B exists alone. In addition, in the present application, the character "/" generally indicates an "and/or" relationship between associated objects before and after the character "/".

In the present application, the terms "connected", "combined", "coupled", and "mounted" may be directly connected, combined, coupled, or mounted and may also be indirectly connected, combined, coupled, or mounted. For example, the direct connection indicates that two parts or assemblies are connected together without an intermediate piece, and the indirect connection indicates that two parts or assemblies are separately connected to at least one intermediate piece and the two parts or assemblies are connected through the intermediate piece. Furthermore, "connected" and "coupled" are not limited to physical or mechanical connections or couplings and may include electrical connections or couplings.

In the present application, those of ordinary skill in the art will understand that a relative term used in conjunction with quantities or conditions (for example, "about", "approximately", "basically", or the like) is inclusive of the stated value and has the meaning indicated by the context. For example, the relative term includes at least the degree of error associated with the measurement of a particular value, the tolerance resulting from manufacturing, assembly, and usage and associated with a particular value, and the like. Such a term should also be considered as disclosing the range defined by the absolute values of two endpoints. The relative term may refer to plus or minus a certain percentage (such as 1%, 5%, 10%, or more) of an indicated value. A value not modified by the relative term should also be disclosed as a particular value with a tolerance. In addition, "basically" when expressing a relative angular position relationship (for example, basically parallel or basically perpendicular) may refer to plus or minus a certain degree (such as 1 degree, 5 degrees, 10 degrees, or more) based on an indicated angle.

In the present application, those of ordinary skill in the art will understand that the function implemented by an assembly may be implemented by one assembly, multiple assemblies, one part, or multiple parts. Similarly, the function implemented by a part may be implemented by a part, an assembly, or a combination of multiple parts.

In the present application, the terms "upper", "lower", "left", "right", "front", "rear", and other orientation words are described by the orientations and position relations shown in the drawings and should not be understood as a limitation to the examples of the present application. In addition, in the context, it is to be understood that when an element is connected "above" or "below" another element, the element not only can be directly connected "above" or "below" another element but also can be indirectly connected "above" or "below" another element through an intermediate element. It is also to be understood that orientation words such as the upper side, the lower side, the left side, the right side, the front side, and the rear side not only represent positive orientations but also may be understood as lateral orientations. For example, below may include directly below, lower left, lower right, front bottom, rear bottom, and the like.

In the present application, the terms “controller”, “processor”, “central processing unit”, “central processing unit (CPU)”, and “microcontroller unit (MCU)” are interchangeable. Where a unit such as the “controller”, the “processor”, the “central processing unit”, the “CPU”, or the “MCU” is used to implement specific functions, these functions may be implemented by a single one of the preceding units or multiple preceding units unless otherwise indicated.

In the present application, the term “device”, “module”, or “unit” is used to implement a specific function in the form of hardware or software.

In the present application, the terms “computing”, “judging”, “controlling”, “determining”, “identifying”, and the like refer to the operations and processes of a computer system or similar electronic computing device (for example, the controller, the processor, or the like).

Figure 2:
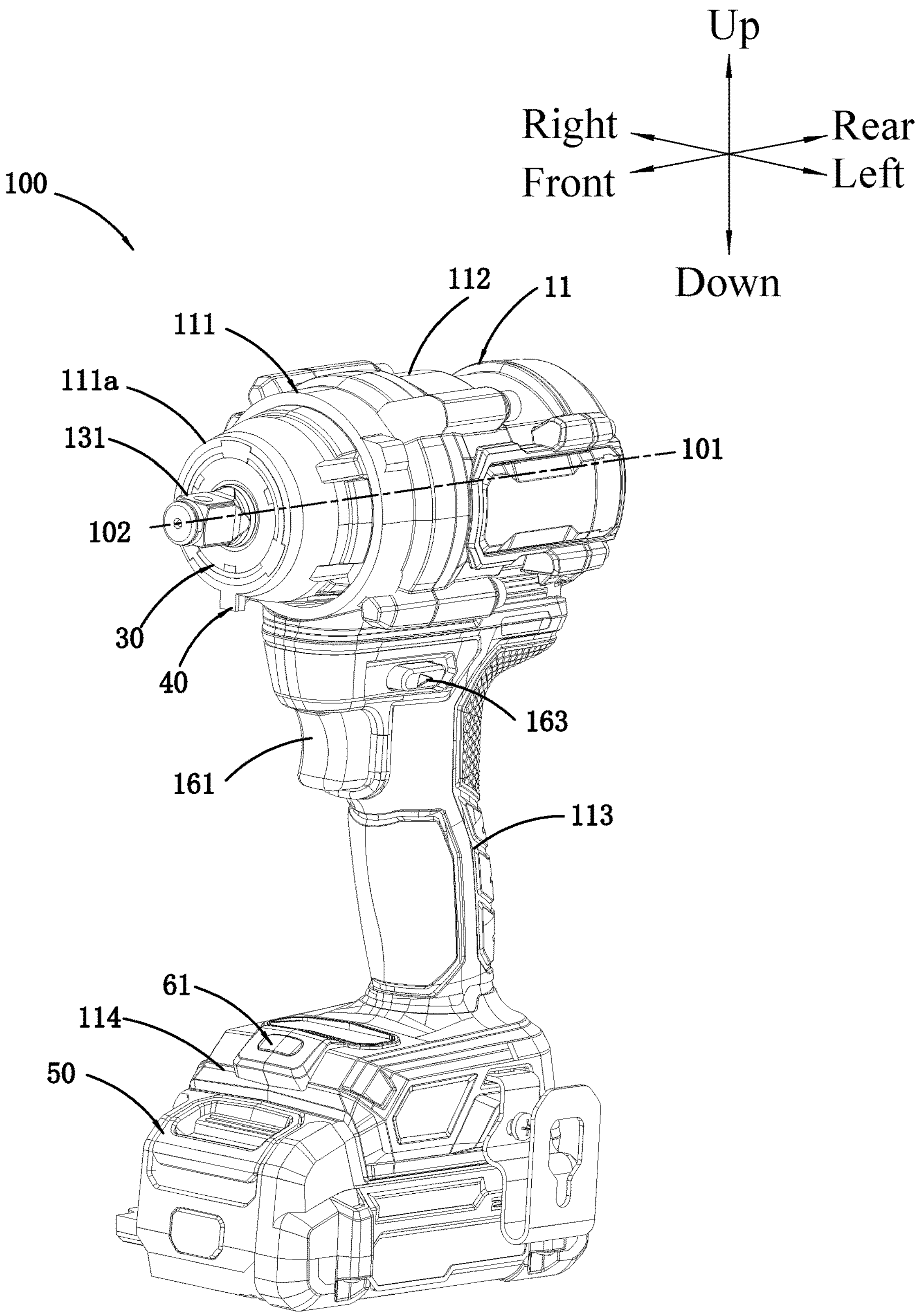
FIG. 2 is a structural view of an example of the present application from another perspective.

As shown in FIGS. 1 and 2, this example provides a power tool, for example, a handheld power tool. The power tool may be a rotary impact tool, such as an impact screwdriver or an impact wrench or may be a rotary power tool, such as an electric drill or another power tool. The power tool may also be another decorating tool, such as an electric hammer or a nail gun. Alternatively, the power tool may also be a saw-like tool, such as a reciprocating saw or a jigsaw. Alternatively, the power tool may also be another cutting tool, such as an electric router. Alternatively, the power tool may also be a sanding tool, such as an angle grinder or a sander. Alternatively, the power tool may also be another power tool, such as a fan. For example, the power tool may also be a powerhead, and the powerhead includes an illumination device such as a lamp. The powerhead is used for adapting to some output assemblies to implement the functions of the tool.

The type of the power tool is not limited in the present application. As long as the power tool can adopt the essence of the technical solutions disclosed below, the power tool is within the scope of the present application.

In this example, the power tool is an impact wrench 100. The impact wrench 100 includes a power supply 50. In this example, the power supply 50 is a direct current power supply. The direct current power supply is used for supplying electrical energy to the impact screwdriver 100. In an optional example, the direct current power supply is a battery pack, and the battery pack mates with a corresponding power supply circuit to supply power to the impact wrench 100. It is to be understood by those skilled in the art that the power supply is not limited to the direct current power supply and may supply power to corresponding components in the body through mains power or an alternating current power supply in conjunction with a corresponding rectifier circuit, filter circuit, and voltage regulator circuit. In this example, the power supply 50 is specifically configured to be the battery pack. A battery pack 50 is used below instead of the power supply, which is not intended to limit the present application.

As shown in FIGS. 1 and 2, the impact wrench 100 includes a housing 11, a power unit 70, and an output mechanism 13. The power unit 70 is used for providing power for the output mechanism 13 and includes a motor 12. The motor 12 includes a drive shaft rotating about a first axis 101. In this example, the motor 12 is specifically configured to be an electric motor. An electric motor 12 is used below instead of the motor, and a motor shaft is used below instead of the drive shaft, which is not intended to limit the present application.

The output mechanism 13 includes an output shaft 131 for connecting a work attachment and driving the work attachment to rotate. A clamping assembly 132 is disposed at the front end of the output shaft 131 and may clamp corresponding work attachments, such as a bit, a drill bit, and a sleeve, when different functions are implemented. In this example, the output shaft 131 may drive a fastener through the sleeve. For example, the fastener may be a bolt. The output shaft 131 is connected to the drive shaft (that is, the motor shaft) and can be driven by the motor shaft to output power so that the electric motor 12 drives, through the motor shaft, the output shaft 131 to rotate to drive the sleeve and the fastener to rotate, and then the fastener is screwed into or unscrewed from a target workpiece.

The output shaft 131 outputs torque externally so that the fastener is operated, and the output shaft 131 rotates about an output axis, where the output axis is a second axis 102 in this example. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

In this example, for the impact wrench 100, the power unit 70 includes the electric motor 12, a transmission mechanism 14, and an impact mechanism 15. The impact mechanism 15 is used for applying an impact force to the output shaft 131. The transmission mechanism 14 is disposed between the electric motor 12 and the impact mechanism 15. In this example, the transmission mechanism 14 is decelerated by a planet gear. The working principle according to which the planet gear performs the deceleration and the deceleration implemented by the transmission mechanism have been completely disclosed to those skilled in the art. Therefore, a detailed description is omitted herein for the brevity of the specification. In some examples, the power unit 70 includes the electric motor 12 and the impact mechanism 15. In some examples, the power unit 70 includes the electric motor 12 and the transmission mechanism 14. In some examples, the power unit 70 includes the electric motor 12, and the electric motor 12 directly drives the output mechanism 13. In some examples, the power unit 70 includes the electric motor 12 and other structures that transmit or transform the power of the electric motor 12 to the output mechanism 13. The preceding does not affect the essence of the present application.

A grip 113 for a user to operate is formed on or connected to the housing 11. The grip 113 and the housing 11 form a T-shaped structure, an L-shaped structure, or a basically linear structure so that the grip 113 is convenient for the user to hold and operate. A power supply connecting portion 14 is formed at or connected to an end of the grip 113. The power supply connecting portion 14 is connected to the battery pack 50.

The impact wrench 100 further includes a main switch 16 and a forward and reverse switch 163. The main switch 16 is disposed on the grip 113 for the user to operate. The main switch 16 is connected to the electric motor 12 and is used for controlling the energized state of the electric motor 12. In some examples, as shown in FIG. 1, the forward and reverse switch 163 is disposed on the upper side of the main switch 16. The forward and reverse switch 163 is configured to be operated to set the direction of rotation of the electric motor 12 to a forward rotation direction along which the fastener is tightened or screwed or a reverse rotation direction along which the fastener is loosened or unscrewed.

In this example, the main switch 16 is a trigger switch, where the trigger switch includes an operating member 161 to be operated and a sliding rheostat. Therefore, the main switch 16 may also adjust the rotational speed of the electric motor 12. The rotational speed of the electric motor 12 is adjusted according to the trigger stroke of the operating member 161. If the trigger strokes of the operating member 161 are different, the signals outputted by the sliding rheostat are different.

The output shaft 131 is disposed at the front end of the housing 11. The housing 11 further includes a first housing 111 for supporting the output shaft 131. At least part of the output shaft 131 is rotatably disposed in the first housing 111.

Figure 3:
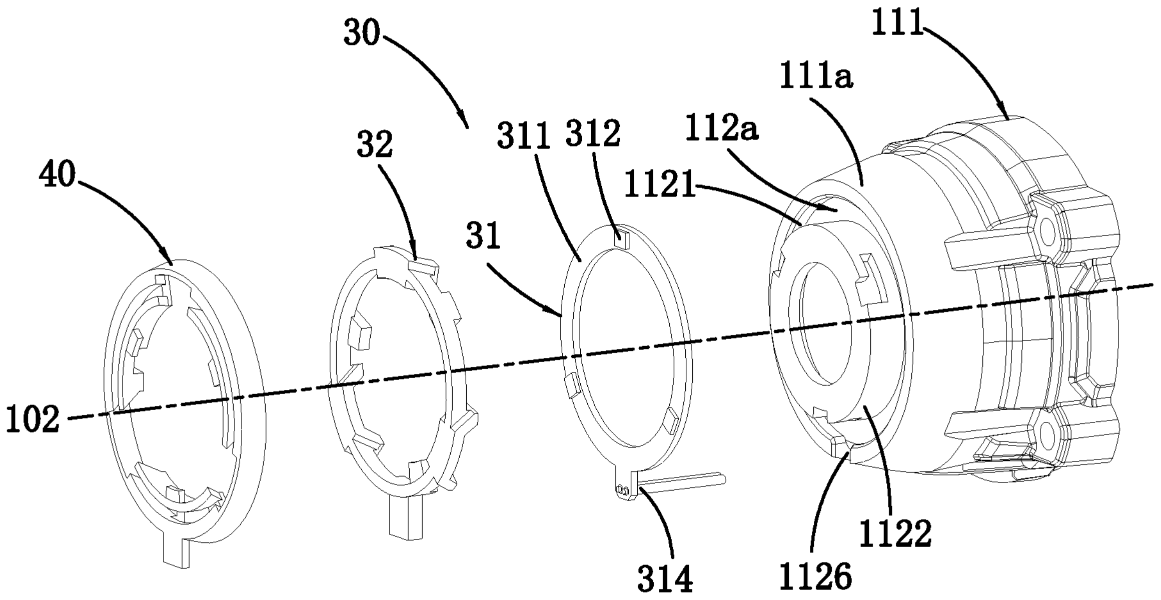
FIG. 3 is a partial exploded view of a power tool in an example of the present application, where an illumination element includes an annular substrate.

The impact wrench 100 further includes a first illumination mechanism 30 for illuminating a region in front of the output shaft 131. As shown in FIG. 3, the first illumination mechanism 30 includes an illumination element 31 and a lampshade 32, where the illumination element 31 generates light for illumination, and the illumination element 31 is mounted in a mounting groove 112*a* formed by a front end 111*a* of the first housing 111. The lampshade 32 covers at least the front of the illumination element 31, part of the lampshade 32 located in front of the illumination element 31 is light-transmissive material, and the lampshade 32 is detachably mounted on the first housing 111. The illumination element 31 may be a light-emitting diode (LED) lamp bead or may be a chip on board (COB) lamp bead.

In the impact wrench 100, the illumination element 31 is disposed at the front end 111*a* of the first housing 111 so that the illumination element 31 is closer to the working position, and the illumination effect is better.

As shown in FIG. 2, the impact wrench 100 further includes a second illumination mechanism 61 for illuminating the working environment of the impact wrench 100, and the second illumination mechanism 61 is disposed below the first housing 111. In this example, the second illumination mechanism 61 is disposed on the power supply connecting portion 14 and emits light to the region in front of the output shaft 131. For example, the second illumination mechanism 61 emits light in a direction from bottom to top. The second illumination mechanism 61 also includes the illumination element and the lampshade. The first illumination mechanism 30 mates with the second illumination mechanism 61 so that the illumination region is wider and higher illumination brightness is ensured.

In some examples, at least one of the first illumination mechanism 30 and the second illumination mechanism 61 is configured to be an illumination mechanism with adjustable brightness and color temperature. The brightness adjustment of the illumination mechanism is used as an example. The brightness of the illumination mechanism is divided into several fixed brightness gears according to a certain interval, and an illumination adjustment portion is provided to select or automatically identify the required brightness gear according to the requirements to determine the illumination brightness of the power tool.

In this example, a controller 17 for controlling the adjustment of the illumination mechanism is included. The controller 17 is disposed on a circuit board, where the circuit board includes a printed circuit board (PCB) and a flexible printed circuit (FPC) board. The controller 17 adopts a dedicated control chip, for example, a single-chip microcomputer or a microcontroller unit (MCU). It is to be noted that the control chip may be integrated into the controller 17 or may be disposed independently of the controller 17. The structural relationship between a driver chip and the controller 17 is not limited in this example.

The brightness of the illumination mechanism completes a gradual change from bright to dark and then to bright under the control of the controller 17, that is to say, the brightness of the illumination mechanism is steplessly adjustable. The brightness adjustment of the illumination mechanism is used as an example. The adjustment method is to switch the state of the illumination adjustment portion to wake up the illumination mechanism to enter a brightness adjustment mode. The brightness of the illumination mechanism begins to change gradually. When the state of the illumination adjustment portion is switched again, the brightness of the illumination mechanism stops changing and remains in the current brightness state. The illumination adjustment portion may be disposed separately (for example, disposed on the power supply connecting portion 14) or may be combined with the switch of the power tool. The illumination adjustment portion may be disposed at any position of the housing 11 according to the operating habit, which does not affect the essence. The state switching form of a brightness switching portion includes, but is not limited to, a single-click, a double-click, long press, and the like.

The start and stop of the brightness adjustment mode of the illumination mechanism may be based on the operation of the user, and the automatic match of the appropriate illumination brightness may be achieved through the sensor identification or other identification devices. The brightness adjustment is no longer limited by the number of gears and may be set arbitrarily within the maximum-minimum brightness range. In some examples, a brightness memory function is also provided. Through user settings or by automatically memorizing the last used brightness, the last used brightness is automatically recalled when the illumination mechanism is used again. Alternatively, the memorized brightness is recalled when needed.

In this example, as shown in FIGS. 3 to 7, the mounting groove 112*a* is annular. The mounting groove 112*a* is disposed along the circumferential direction of the output shaft 131, and the illumination element 31 is mounted in the mounting groove 112*a*. Optionally, the illumination element 31 may be placed at different positions in the annular mounting groove 112*a*, so as to achieve different illumination paths.

For the structure of the illumination element 31, in this example, the illumination element 31 includes a lamp substrate 311 and light-emitting elements 312 on the lamp substrate 311. Multiple light-emitting elements 312 allow light to be emitted from multiple positions so that the illuminated region in front of the output shaft 131 is brighter and has a larger range. In this example, the outer sidewall of the mounting groove 112*a* is a groove wall 1127 extending toward the direction of the output shaft, and the lamp substrate 311 is placed in the mounting groove 112*a* and limited by the groove wall 1127. This arrangement makes the structure of the entire housing 11 more compact. In this example, the lamp substrate 311 is an integrally formed annular substrate structure, and the multiple light-emitting elements 312 are arranged on the annular substrate at intervals along the circumferential direction. The use of the lamp substrate 311 with an annular substrate structure facilitates the machining and installation of the illumination element 31 and improves the efficiency of machining and installation.

For the position relation between the illumination element 31 and the lampshade 32, in this example, the mounting groove 112*a* includes a first annular surface 1121, a second annular surface 1122, and a groove bottom 1123 connecting the first annular surface 1121 to the second annular surface 1122. The illumination element 31 is disposed between the first annular surface 1121 and the second annular surface 1122, a gap L exists between the lampshade 32 and the illumination element 31 along the extension direction of the output shaft 131 (the direction of the second axis 102), and the gap L has a dimension greater than zero. In this example, the gap L exists between the lampshade 32 and the light-emitting elements 312. The gap L provided between the lampshade 32 and the illumination element 31 can effectively prevent the lampshade 32 from colliding with the illumination element 31 during disassembly, thereby improving the safety and service life of the illumination element 31. In addition, the gap exists between the lampshade 32 and the illumination element 31 so that when the lampshade 32 is slightly deformed due to the external force extrusion, the slightly deformed lampshade 32 can be prevented from being in contact with the illumination element 31, thereby further improving the safety and service life of the illumination element 31.

As shown in FIG. 3 and FIGS. 7 to 12, for the structure of the lampshade 32, in this example, the lampshade 32 includes a connecting frame 321, light emission portions 322, and first connecting portions 323, where the light emission portions 322 and the first connecting portions 323 are disposed on the connecting frame 321. The light emission portion 322 is located in front of the light-emitting element 312. Second connecting portions are disposed on one of the first annular surface 1121 or the second annular surface 1122 of the mounting groove 112*a*, and the first connecting portion 323 and the second connecting portion mate with each other to form a detachable connection. In this example, the first connecting portion 323 and the second connecting portion form a protrusion-and-groove connection. The connection efficiency of the lampshade 32 is improved through the protrusion-and-groove connection.

Figure 4:
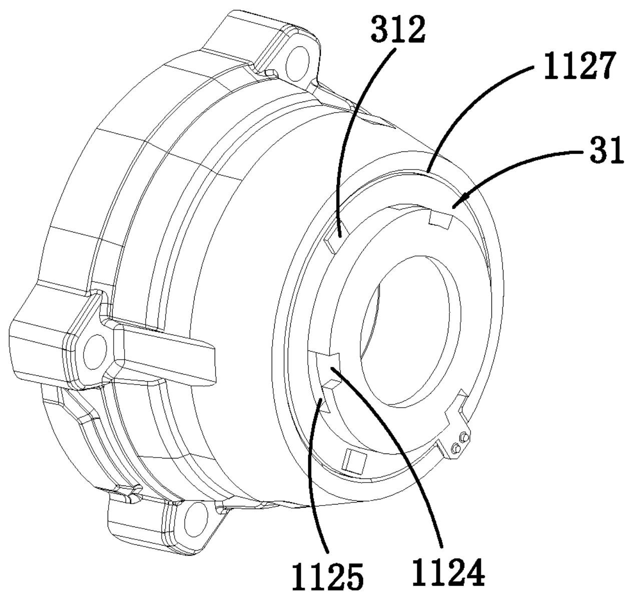
FIG. 4 is a structural view of a front end and an illumination element in an example of the present application, where a lamp substrate included in the illumination element is an annular-plate structure.
Figure 5:
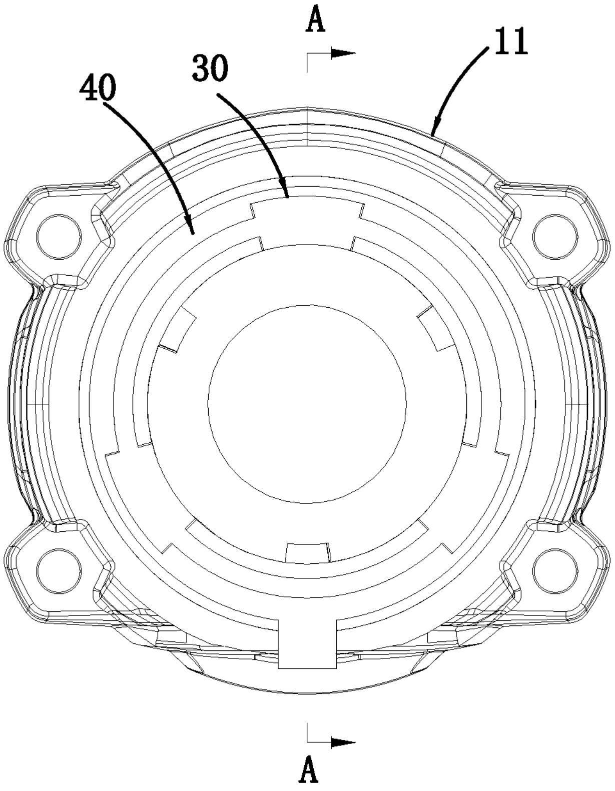
FIG. 5 is a structural view of a front end and a first illumination mechanism in an example of the present application, where a lamp substrate included in an illumination element is an annular-plate structure.
Figure 6:
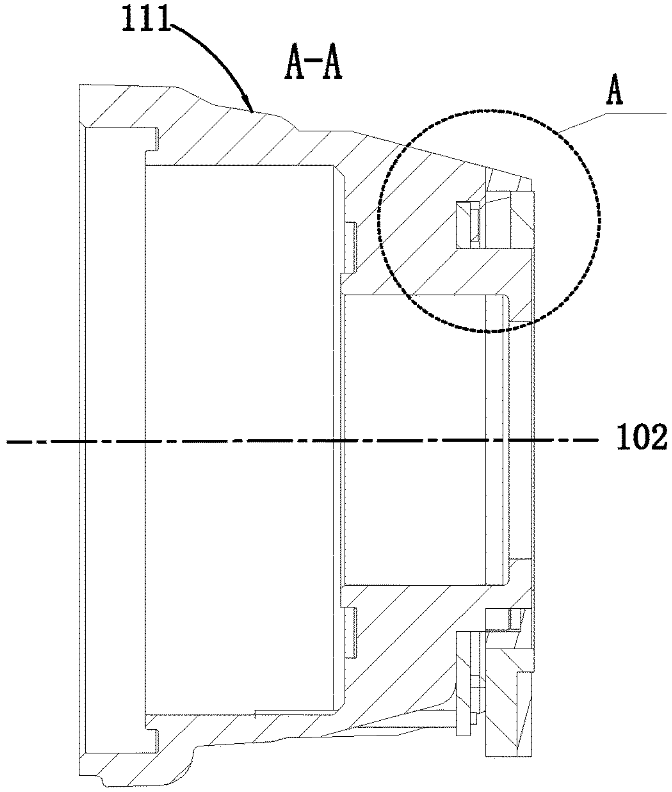
FIG. 6 is a sectional view taken along a direction A-A' in FIG. 5.
Figure 7:
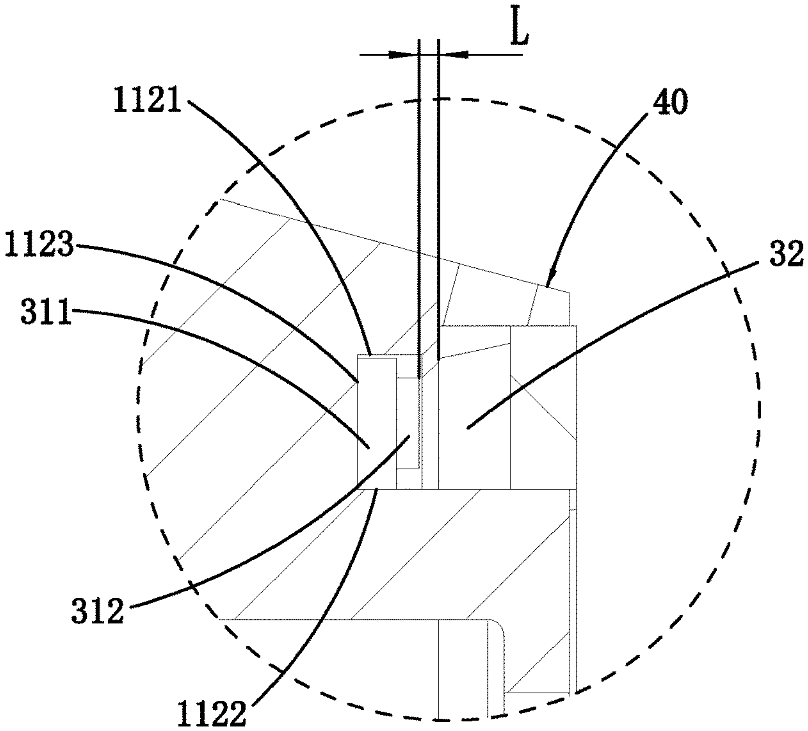
FIG. 7 is a partial enlarged view of part A in FIG. 6.

For the structure of the connection between the first connecting portion 323 and the second connecting portion, for example, the first connecting portion 323 includes a protruding structure protruding from the inner side of the connecting frame 321. As shown in FIG. 4, the second connecting portion includes a first groove 1124 and a second groove 1125 that are disposed on the second annular surface 1122 and connect with each other, and the protruding structure can penetrate the first groove 1124, is rotated, and then enters the second groove 1125. In other alternative examples, the first groove 1124 and the second groove 1125 are two grooves with different orientations, and the protruding structure can move along the first groove 1124 and the second groove 1125. When the protruding structure moves from the end of the first groove 1124 to the intersection of the first groove 1124 and the second groove 1125, the movement of the protruding structure is restricted by the second groove 1125. After the protruding structure enters the second groove 1125, the protruding structure mates with the second groove 1125 so that the protruding structure is kept in a state in which the movement of the protruding structure is restricted by the second groove 1125. The first groove 1124 and the second groove 1125 are provided so that the connection between the lampshade 32 and the first housing 111 can be completed through inserting and screwing, the operation is simple, and the installation efficiency is high.

To prevent the lampshade 32 from being damaged, in this example, the power tool further includes a protective cover 40, where the protective cover 40 is annular and at least partially disposed on the outer circumference of the lampshade 32. An annular groove 41 is disposed at an end of the protective cover 40, bypass grooves 42 penetrating the protective cover 40 are disposed along the axial direction of the protective cover 40, and the bypass grooves 42 are used for light to pass through. The lampshade 32 is located in the annular groove 41, and the first connecting portion 323 partially penetrates the annular groove 41. The connecting frame 321 is located in the annular groove 41, and the light emission portion 322 is located in the bypass groove 42. In this example, the protective cover 40 is provided with through holes 43 penetrating to the inside, and the first connecting portion 323 penetrates the annular groove 41 from the through hole 43. Through the preceding arrangement, in the first aspect, the connection between the first connecting portion 323 and the second connecting portion can be achieved. In the second aspect, the protective cover 40 may also be disposed between the connecting frame 321 and the first connecting portions 323 of the lampshade 32, thereby avoiding the separation of the protective cover 40 and the lampshade 32 and improving the assembly efficiency.

To protect the front end of the lampshade 32, in this example, the protective cover 40 is provided with stopper portions 44, and when the protruding structure is located in the second groove 1125, the stopper portion 44 is located in the first groove 1124. This component is provided so that the front end surface of the lampshade 32 can be protected, the first groove 1124 is sealed, and the following is avoided: due to the accumulation of the dust, the first connecting portion 323 is stuck when connected to the second groove 1125.

In this example, the protective cover 40 is made of soft materials, such as rubber, silicone, or the like. Since the rubber material can undergo a certain elastic deformation, the rubber material can withstand a certain impact and facilitate the installation and cooperation between the protective cover 40 and the lampshade 32.

As shown in FIG. 3, the illumination element 31 further includes a wire 314 for connecting the battery pack to the illumination element 31, and the wire lead-out direction of the wire 314 is parallel to the second axis 102. The preceding arrangement of the wire 314 avoids the bending of the wire 314 and improves the service life. In this example, a wire lead-out groove 1126 is disposed on the front end 111*a*, an end of the wire lead-out groove 1126 connects with the mounting groove 112*a*, and the other end of the wire lead-out groove 1126 penetrates the outer sidewall of the mounting groove 112*a*. In this example, the wire lead-out groove 1126 is disposed below the output shaft. The wire lead-out groove 1126 is disposed in the first housing 111 and located below the output shaft.

An extension portion is disposed at the edge of the lamp substrate 311 and located in the wire lead-out groove 1126, and the wire 314 is connected to an end of the extension portion facing away from the lamp substrate 311 so that the wire 314 may be perpendicular to the lamp substrate 311, and the wire does not need to be bent during wiring to the rear of the front end 111*a*.

Figure 8:
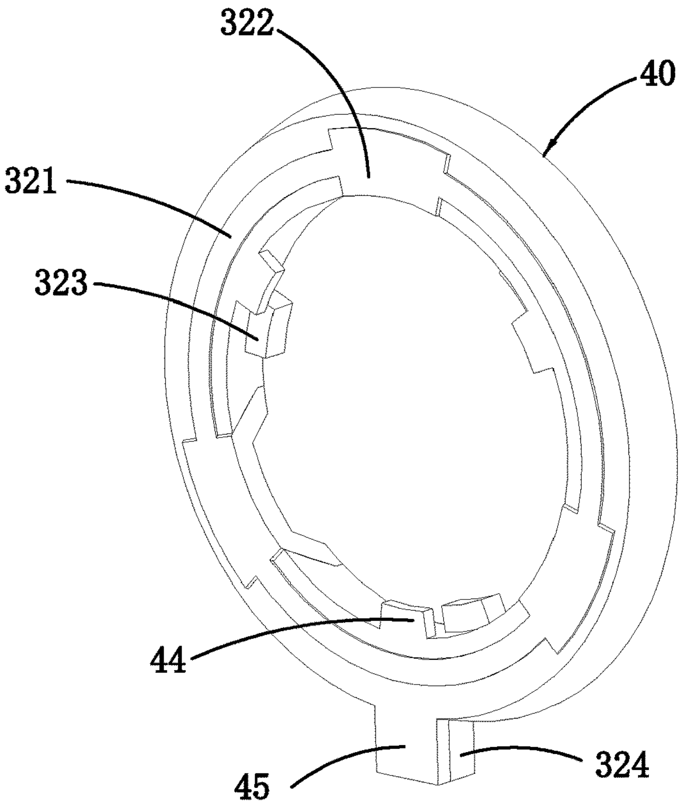
FIG. 8 is a structural view of a lampshade and a protective cover from a first perspective in an example of the present application.
Figure 9:
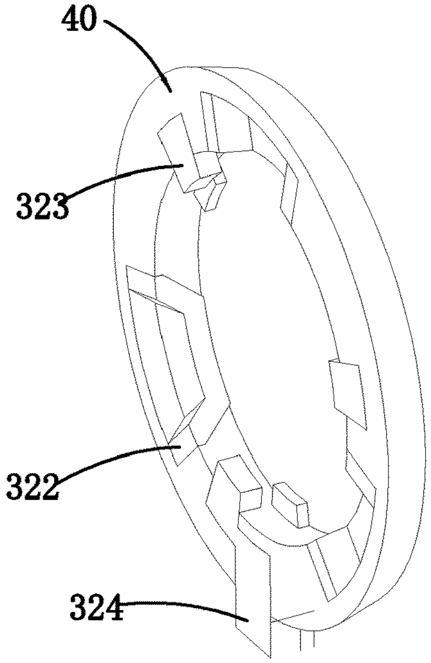
FIG. 9 is a structural view of a lampshade and a protective cover from a second perspective in an example of the present application.
Figure 10:
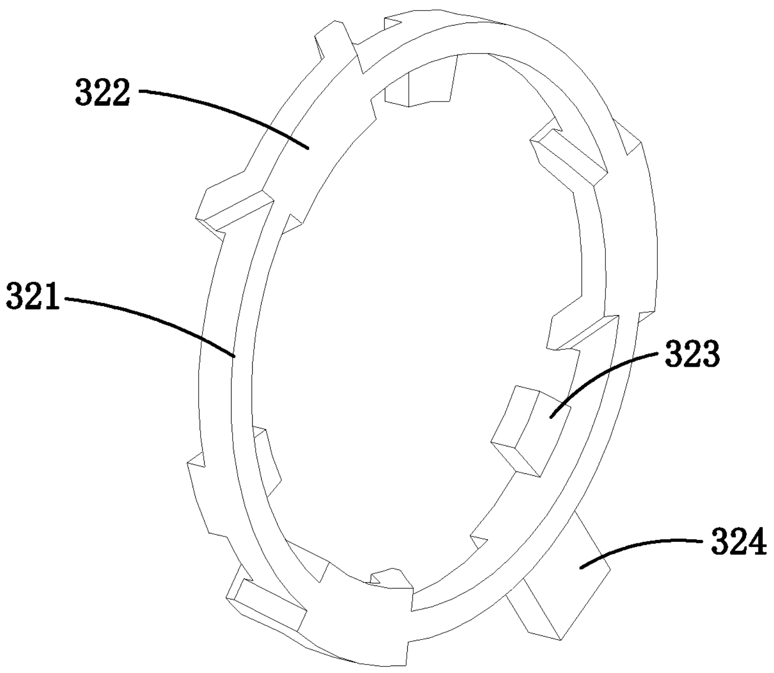
FIG. 10 is a structural view of a lampshade in an example of the present application.
Figure 11:
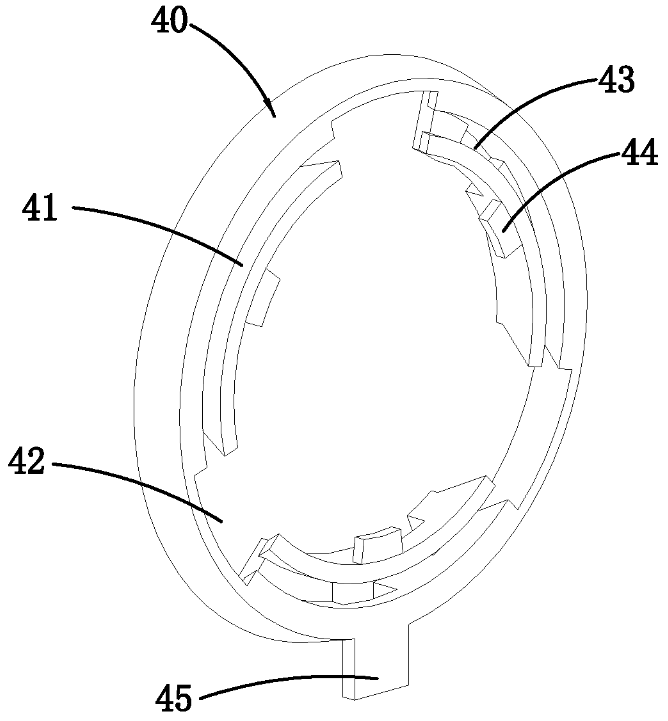
FIG. 11 is a structural view of a protective cover from a first perspective in an example of the present application.
Figure 12:
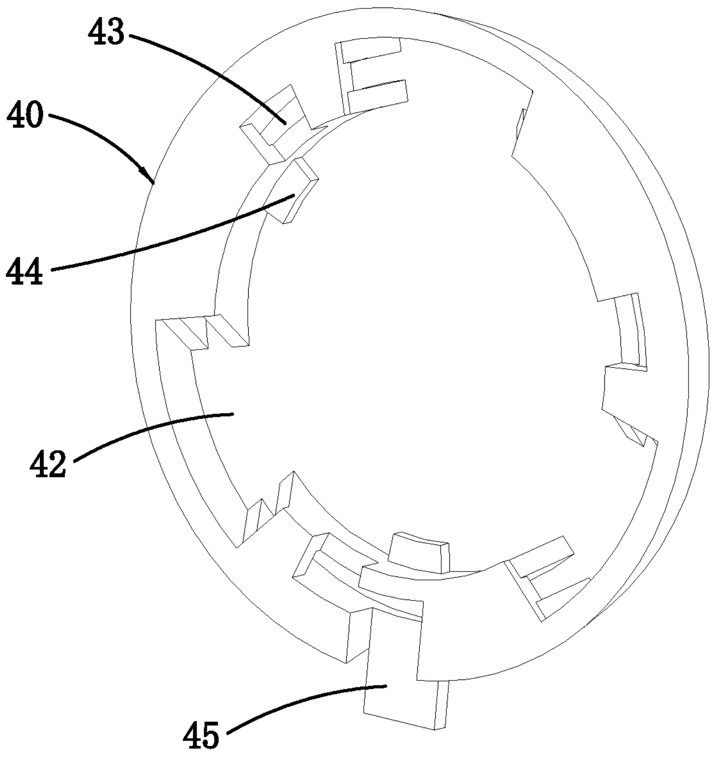
FIG. 12 is a structural view of a protective cover from a second perspective in an example of the present application.
Figure 13:
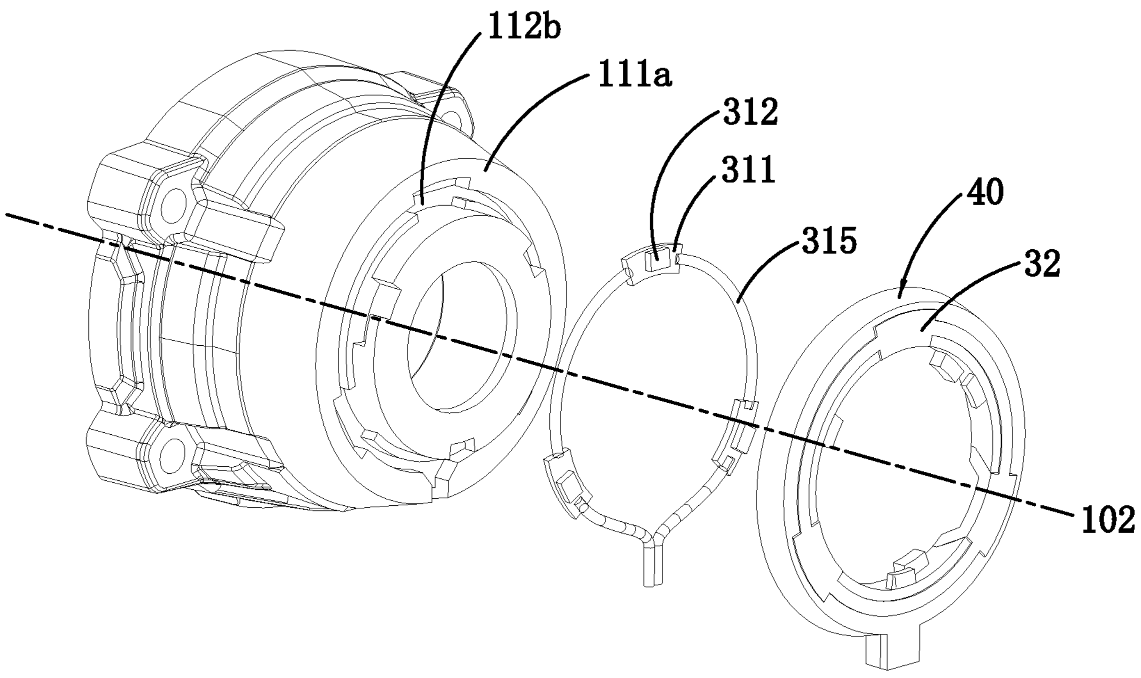
FIG. 13 is a partial exploded view of a power tool in an example of the present application, where a lamp substrate is split.
Figure 14:
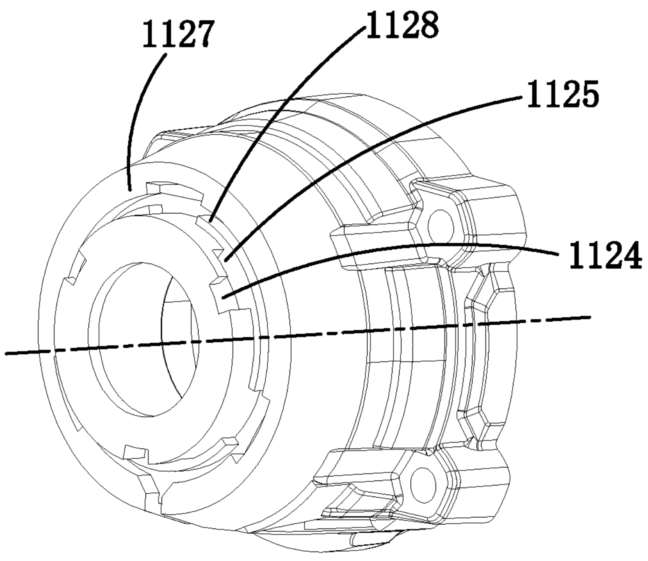
FIG. 14 is a structural view of a front end in an example of the present application.
Figure 15:
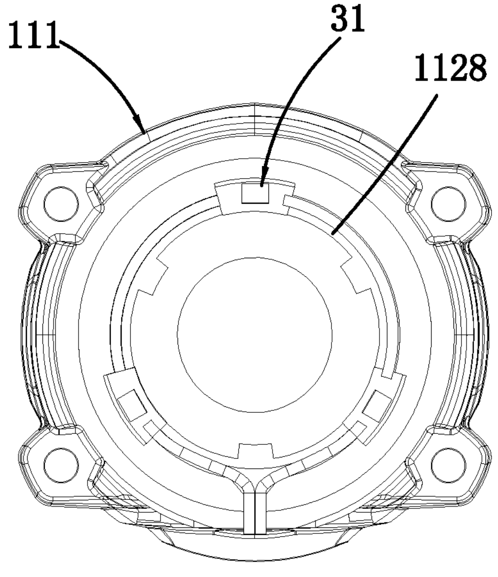
FIG. 15 is a structural view of a front end and an illumination element in an example of the present application, where a circuit board is split.
Figure 16:
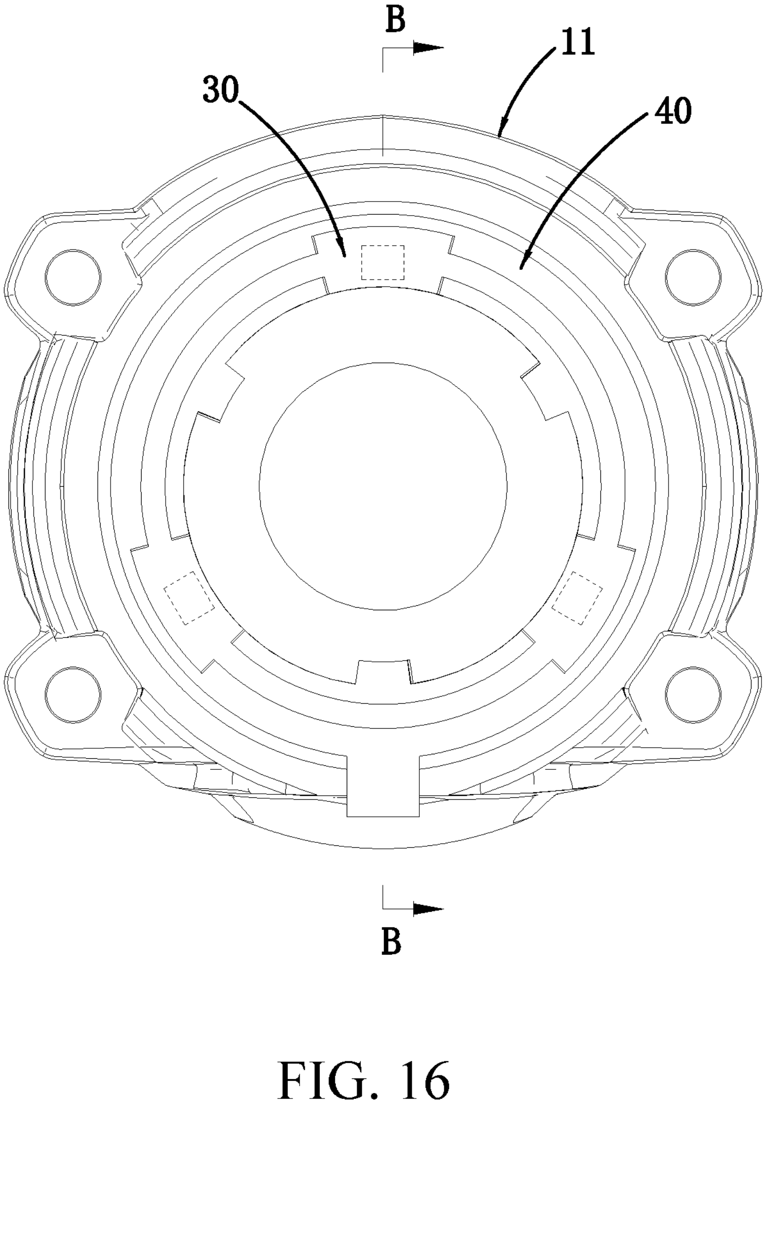
FIG. 16 is a structural view of a front end and a first illumination mechanism in an example of the present application, where a circuit board is split.

As shown in FIG. 8, the lampshade 32 is provided with a protection portion 324, and the protection portion 324 covers the opening of the wire lead-out groove 1126 to protect the extension portion in the wire lead-out groove 1126 and the wire 314. To protect the protection portion 324, in this example, the protective cover 4 is provided with a second protection portion 45, and the second protection portion 45 can cover the protection portion 324. The second protection portion 45 may be located in the wire lead-out groove 1126.

The illumination element 31 has an interference fit with the annular groove 41 or the illumination element 31 engages with the first annular surface 1121 to avoid collision between the illumination element 31 and the lampshade 32 after the illumination element 31 moves.

As shown in FIGS. 13 to 18, in another example of the present application, the illumination element 31 includes multiple lamp substrates 311. It is to be understood that the multiple light-emitting elements 312 in the illumination element 31 are distributed on the multiple lamp substrates 311. The multiple lamp substrates 311 are scattered in a mounting groove 112*b* around the output shaft 131. Two adjacent lamp substrates 311 are connected by a circuit 315. A first limiting member 1128 is disposed on the inner sidewall of the mounting groove 112*b*, and the first limiting member 1128 is located at the opening of the mounting groove 112*b*. The first limiting member 1128 is provided so that the opening dimension of the mounting groove 112*b* is less than the internal dimension of the mounting groove 112*b*. The circuit 315 is mounted in the first limiting member 1128 of the mounting groove 112*b*, so as to prevent the circuit 315 from falling out of the mounting groove 112*b* during the installation process. The first limiting member 1128 is provided so that the process of placing the circuit 315 in the mounting groove 112*b* can be limited without additional fixing, thereby improving the installation efficiency of the illumination element 31. The first limiting member 1128 is provided with a notch, the notch and a lamp groove 1127 form an accommodation groove, and the lamp substrate 311 is placed in the accommodation groove.

As shown in FIGS. 15 to 18, the illumination element 31 is accommodated in the front end 111*a* of the first housing 111, and an optical axis of the light emitted by the illumination element 31 extends obliquely outward relative to the output shaft 131. In this manner, the light emitted by the illumination element 31 of the illumination device can illuminate a larger region without enlarging the diameter of the illumination device. On the other hand, the relatively large illumination region can prevent the large-diameter attachment mounted on the output shaft 131 from blocking the light so that the light can reach the working position smoothly, thereby further improving the illumination effect. It is to be understood that when the illumination element 31 emits light, the light expands due to scattering of light. In the present application, the optical axis of the emitted light extends obliquely outward relative to the output axis 131, further expanding the illumination region on the premise of light expansion due to scattering of light. It is to be explained that in the related art, the optical axis is an imaginary line in the optical system. If the optical system has a certain degree of rotational symmetry (like a camera lens or a microscope), the optical axis is generally the center of rotation in the optical system. If the optical system is formed by simple lenses and reflectors, the optical axis passes through the center of curvature (such as the focal point) of each plane and coincides with the axis of rotational symmetry. Therefore, it is to be understood that no matter whether a light source is a light board or a lamp bead, no matter whether the lens exists or not, the light emitted by the light source has an optical axis at the center. The optical axis extends obliquely outward relative to the output shaft 131, that is to say, a straight line where the center of the emitted light is located extends obliquely outward relative to the output shaft 131. The light source may be inclined, or the optical axis of the light is inclined through the lens.

The mounting groove 112*b* is disposed at the front end 111*a* of the first housing 111, and the illumination element 31 is mounted in the mounting groove 112*b*. The illumination element 31 disposed in the mounting groove 112*b* is protected from the external impact, and the service life of the illumination element 31 is increased.

In this example, for the structure of the mounting groove 112*b*, for example, the mounting groove 112*b* includes the groove bottom 1123, the groove bottom 1123 is oblique, the vertical line 103 of the groove bottom 1123 expands outward relative to the output shaft 131, and the illumination element 31 abuts against the groove bottom 1123. In this example, the cross section of the mounting groove 112*b* may be circular, polygonal, or annular. In another example, the axis of the mounting groove 112*b* expands outward relative to the output shaft 131, and the illumination element 31 abuts against the sidewall of the mounting groove 112*b*. It is to be noted that, in this example, the section of the mounting groove 112*b* is circular or polygonal, and the mounting groove 112*b* is disposed on the outer circumference of the output shaft 131. Multiple mounting grooves 112*b* may be provided for mounting multiple illumination elements 31. In the third example, the vertical line 103 of the groove bottom 1123 of the mounting groove 112*b* expands outward relative to the output shaft 131, and the axis of the mounting groove 112*b* expands outward relative to the output shaft 131. It is to be noted that, in this example, the cross section of the mounting groove 112*b* may only be circular or polygonal.

At least two illumination elements 31 are provided, and the optical axis of the light emitted by any one of the illumination elements 31 extends obliquely outward relative to the output shaft 131. Through the preceding arrangement, the illumination range can be expanded, which is convenient for the work to be carried out.

For the positional arrangement of the illumination elements 31, in one example, two illumination elements 31 are symmetrical to the center of the output shaft 131. In another example, multiple illumination elements 31 are annularly disposed along the circumferential direction of the output shaft 131. Through the preceding arrangement, the illumination range can be expanded as much as possible, the illumination brightness can be increased, and dark shadows in a work region can be avoided.

In the example in which the mounting groove 112*b* is annular, that is, the cross section of the mounting groove 112*b* is annular, the axis of the mounting groove 112*b* is collinear with the axis of the output shaft 131, and the illumination element 31 is mounted in the mounting groove 112*b*. This arrangement facilitates the machining of the mounting groove 112*b* and the installation of the illumination elements 31 arranged annularly.

In some examples, the mounting groove 112*b* includes the first annular surface 1121, the second annular surface 1122, and the groove bottom 1123, the first annular surface 1121 is disposed on the outer circumference of the second annular surface 1122, the groove bottom 1123 connects the first annular surface 1121 to the second annular surface 1122, the groove bottom 1123 is oblique, the vertical line 104 of the groove bottom 1123 extends obliquely outward relative to the output shaft 131, the angle of inclination is $\alpha$, $0° < \alpha \leq 45°$, and the illumination element 31 abuts against the groove bottom 1123. In some examples, the angle of inclination is $\alpha$, and $0° < \alpha \leq 30°$. In some examples, the angle of inclination is $\alpha$, and $0° < \alpha \leq 20°$. In the preceding mounting manner, the contact area between the illumination element 31 and the groove bottom 1123 can be increased as much as possible so that the installation of the illumination element 31 is more stable.

In some alternative examples, the mounting groove 112*b* includes the first annular surface 1121, the second annular surface 1122, and the groove bottom 1123, the first annular surface 1121 is disposed on the outer circumference of the second annular surface 1122, the groove bottom 1123 connects the first annular surface 1121 to the second annular surface 1122, the first annular surface 1121 extends obliquely outward relative to the output shaft 131, and the illumination element 31 is sandwiched between the first annular surface 1121 and the second annular surface 1122. In another example, the illumination element 31 is fixedly connected to the first annular surface 1121 or the second annular surface 1122. In this example, the second annular surface 1122 may be parallel to the first annular surface 1121 and may also be parallel to the output shaft 131. The first annular surface 1121 is provided so that the illumination of light can be avoided, the magnitude of the expansion angle of the first annular surface 1121 can restrict the light to a certain extent, and the light in the work region is more standardized.

As shown in FIG. 2, the housing 11 further includes a motor housing 112. The motor housing 112 accommodates at least part of the power unit 70. The first housing 111 is disposed in front of the motor housing 112. The first housing is connected to an output housing by the fastener. In some examples, the first housing and the output housing are integrally formed, and the housing 11 is divided into two parts by a direction perpendicular to the second axis 102 to facilitate manufacture and installation.

Figure 17:
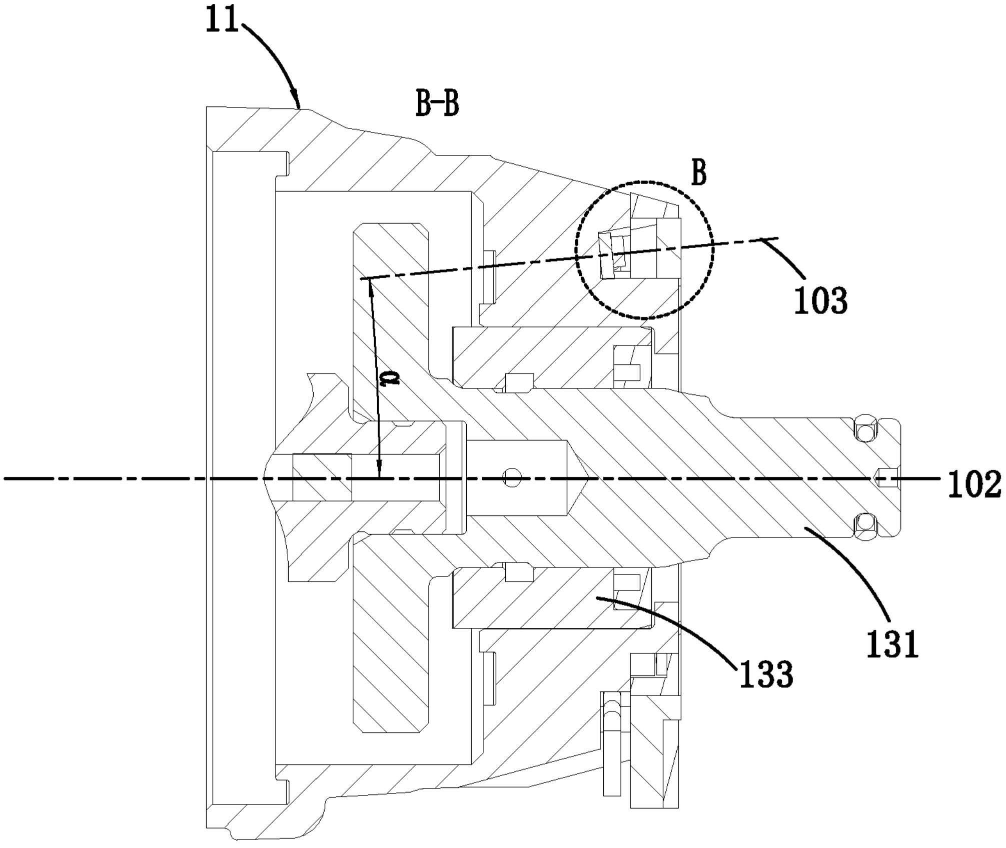
FIG. 17 is a sectional view taken along a direction B-B' in FIG. 16.
Figure 18:
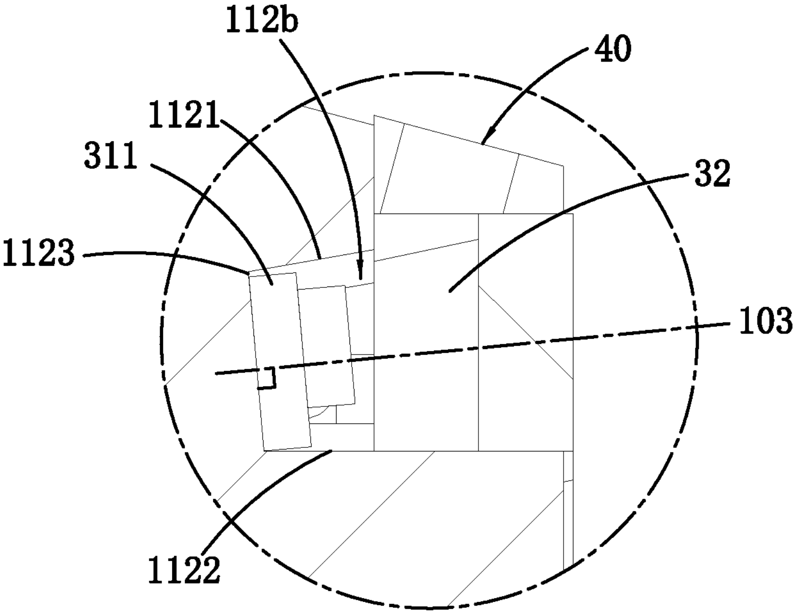
FIG. 18 is a partial enlarged view of part B in FIG. 17.

As shown in FIG. 17, a shaft sleeve 133 for supporting the rotation of the output shaft 131 is disposed on the outer side of the output shaft 131. The shaft sleeve 133 is mounted in the first housing. In this example, the outer side of the shaft sleeve 133 abuts against the inner sidewall of the first housing. In this example, the shaft sleeve 133 may be a steel sleeve or a bearing.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool, comprising:
an output shaft for outputting power;
a housing comprising a first housing for supporting the output shaft, wherein at least part of the output shaft is rotatably disposed in the first housing; and
a first illumination mechanism illuminating a region in front of the output shaft;
wherein the first illumination mechanism comprises:
an illumination element generating light for illumination, wherein the illumination element is mounted in a mounting groove formed by a front end of the first housing; and
a lampshade covering at least a front of the illumination element, wherein a part of the lampshade located in front of the illumination element is a light-transmissive material, and the lampshade is detachably mounted on the first housing, the lampshade comprises a connecting portion, the lampshade operably coupleable with the first housing to mount the lampshade on the first housing via the connecting portion,
the lampshade comprises a light emission portion and a first connecting portion, a second connecting portion is disposed on a first annular surface or a second annular surface of the mounting groove, and the first connecting portion is detachably connected to the second connecting portion, and
the second connecting portion comprises a first groove and a second groove that are disposed on the second annular surface and connect with each other, and the first connecting portion penetrates the first groove, is rotated, and then enters the second groove.

2. The power tool of claim 1, wherein the mounting groove is annular, and the mounting groove and part of the first housing supporting the output shaft are integrally formed and disposed along a circumferential direction of the output shaft.

3. The power tool of claim 2, wherein the illumination element is mounted in the mounting groove.

4. The power tool of claim 2, wherein the illumination element comprises a lamp substrate and a light-emitting element on the lamp substrate.

5. The power tool of claim 4, wherein a plurality of light-emitting elements are provided along the circumferential direction of the output shaft.

6. The power tool of claim 4, wherein a plurality of lamp substrates are provided, the light-emitting element is disposed on each of the plurality of lamp substrates, and the plurality of lamp substrates are disposed along the circumferential direction of the output shaft.

7. The power tool of claim 4, wherein the lamp substrate is an annular substrate disposed around the output shaft.

8. The power tool of claim 4, wherein the lamp substrate is mounted in the mounting groove.

9. The power tool of claim 1, further comprising a protective cover, wherein the protective cover is annular and at least partially disposed on an outer circumference of the lampshade.

10. The power tool of claim 9, wherein the protective cover is made of soft materials.

11. The power tool according to claim 1, wherein the illumination element further comprises a wire, the first housing comprises a wire lead-out groove for accommodating the wire, a wire lead-out direction of the wire is parallel to an axis of the output shaft, and the wire lead-out groove is located below the output shaft.

12. A power tool, comprising:
an output shaft for outputting power;
a housing comprising a first housing for supporting the output shaft, wherein at least part of the output shaft is rotatably disposed in the first housing; and
a first illumination mechanism illuminating a region in front of the output shaft;
wherein the first illumination mechanism comprises:
an illumination element generating light for illumination, wherein the illumination element is accommodated in a mounting groove formed by a front end of the first housing, at least two illumination elements are provided, and an optical axis of light emitted by any one of the at least two illumination elements is oblique outward relative to the output shaft
further comprising a lampshade covering at least a front of the at least two illumination elements, wherein a part of the lampshade located in front of the at least two illumination elements is a light-transmissive material, and the lampshade is detachably mounted on the first housing and the lampshade comprises a connecting portion, the lampshade operably coupleable with the first housing to fix the lampshade on the first housing via the connecting portion, wherein the mounting groove comprises a first annular surface, a second annular surface, and a groove bottom connecting the first annular surface to the second annular surface, and the illumination element is disposed between the first annular surface and the second annular surface, wherein the lampshade comprises a light emission portion and a first connecting portion, the light emission portion is located in front of the illumination element, a second connecting portion is disposed on the first annular surface or the second annular surface of the mounting groove, and the first connecting portion is detachably connected to the second connecting portion, and wherein the second connecting portion comprises a first groove and a second groove that are disposed on the second annular surface and connect with each other, and the first connecting portion penetrates the first groove, is rotated, and then enters the second groove.

13. The power tool of claim 12, wherein a plurality of illumination elements are annularly disposed along a circumferential direction of the output shaft.

14. The power tool of claim 12, wherein each of the at least two illumination elements comprises a lamp substrate and a light-emitting element on the lamp substrate, a plurality of lamp substrates are provided, the light-emitting element is disposed on each of the plurality of lamp substrates, and the plurality of lamp substrates are disposed along a circumferential direction of the output shaft.

15. A power tool, comprising:

an output shaft for outputting power;

a housing comprising a first housing for supporting the output shaft, wherein at least part of the output shaft is rotatably disposed in the first housing; and a first illumination mechanism illuminating a region in front of the output shaft;

wherein the first illumination mechanism comprises:

an illumination element generating light for illumination, wherein the illumination element is mounted in a mounting groove formed by a front end of the first housing; and a lampshade covering at least a front of the illumination element, wherein a part of the lampshade located in front of the illumination element is a light-transmissive material, and the lampshade is detachably mounted on the first housing, the lampshade comprises a connecting portion, the lampshade operably coupleable with the first housing to mount the lampshade on the first housing via the connecting portion, wherein a gap exists between the lampshade and the illumination element along an extension direction of the output shaft, wherein the mounting groove comprises a first annular surface, a second annular surface, and a groove bottom connecting the first annular surface to the second annular surface, and the illumination element is disposed between the first annular surface and the second annular surface, wherein the lampshade comprises a light emission portion and a first connecting portion, the light emission portion is located in front of the illumination element, a second connecting portion is disposed on the first annular surface or the second annular surface of the mounting groove, and the first connecting portion is detachably connected to the second connecting portion, and wherein the second connecting portion comprises a first groove and a second groove that are disposed on the second annular surface and connect with each other, and the first connecting portion penetrates the first groove, is rotated, and then enters the second groove.

* * * * *